(12) United States Patent
Nelson

(10) Patent No.: US 10,279,721 B1
(45) Date of Patent: May 7, 2019

(54) CONTAINER FOR SECURELY HOLDING CONVENTIONAL CUPS WITH LIDS THEREON

(71) Applicant: Marc Nelson, Carver, MA (US)

(72) Inventor: Marc Nelson, Carver, MA (US)

( * ) Notice: Subject to any disclaimer, the term of this patent is extended or adjusted under 35 U.S.C. 154(b) by 241 days.

(21) Appl. No.: 15/451,463

(22) Filed: Mar. 7, 2017

(51) Int. Cl.
*B60N 3/10* (2006.01)
*A47J 41/00* (2006.01)
*B65D 3/04* (2006.01)
*B65D 43/02* (2006.01)
*B65D 83/00* (2006.01)
*B65D 81/38* (2006.01)

(52) U.S. Cl.
CPC .............. *B60N 3/103* (2013.01); *A47J 41/00* (2013.01); *B65D 3/04* (2013.01); *B65D 43/022* (2013.01); *B65D 81/3841* (2013.01); *B65D 83/0038* (2013.01)

(58) Field of Classification Search
CPC . B60N 3/103; A47J 41/00; B65D 3/04; B65D 43/022; B65D 81/3841; B65D 81/0038
See application file for complete search history.

(56) References Cited

U.S. PATENT DOCUMENTS

| | | | | |
|---|---|---|---|---|
| 3,090,478 A | * | 5/1963 | Stanley | .................... B65B 43/54 141/177 |
| 5,040,719 A | * | 8/1991 | Ballway | ............. A47G 19/2205 215/10 |
| 6,367,652 B1 | * | 4/2002 | Toida | .................. B65D 25/2811 220/592.16 |
| 7,731,144 B2 | * | 6/2010 | Kazyaka | ................ B60N 3/107 248/311.2 |
| 8,141,740 B2 | | 3/2012 | Agnello | |
| 2002/0121104 A1 | * | 9/2002 | Duff | .......................... F25D 3/08 62/457.4 |
| 2005/0056759 A1 | * | 3/2005 | Tiller | ..................... A47G 23/03 248/346.11 |
| 2005/0082455 A1 | | 4/2005 | Jones | |
| 2008/0006643 A1 | * | 1/2008 | Ma | ....................... A47J 41/0011 220/592.16 |
| 2010/0200720 A1 | | 8/2010 | Kaemmer | |
| 2012/0049030 A1 | | 3/2012 | Tussy | |
| 2014/0197657 A1 | | 7/2014 | Gillis et al. | |
| 2015/0053679 A1 | * | 2/2015 | Liu | .................... B65D 81/3881 220/215 |
| 2015/0201779 A1 | * | 7/2015 | Tittel | ........................ A45F 3/20 220/731 |
| 2016/0039324 A1 | | 2/2016 | Muiter et al. | |
| 2017/0119186 A1 | * | 5/2017 | Rivera | ............... A47G 23/0233 |

* cited by examiner

Primary Examiner — Corey N Skurdal
(74) Attorney, Agent, or Firm — Stan Collier, Esq.

(57) ABSTRACT

A cup container has a cap upon a bottom container. The cup container is intended to fit into a vehicle console holder. Inside the coffee, for example, cup container is a standard sized coffee cup with its lid such as available at McDonald's, small 12 oz., medium 16 oz., or large 21 oz. The cup may hold hot or cold liquid. Further the cap has a hollow interior that is or may be a partial vacuum. A spacer inside of the cup container fits loosely over the top of the coffee cup lid to center it. The cup container has an interior wall/housing integrally formed to the top edge of the outer wall so that the volume between the outer wall and the interior wall may also be a partial vacuum. The coffee cup container with a coffee cup therein may be carried without spilling liquid therefrom.

8 Claims, 5 Drawing Sheets

CONTAINER FOR SECURELY HOLDING CONVENTIONAL CUPS WITH LIDS THEREON

REFERENCE TO RELATED APPLICATIONS

NA

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

Field of the Invention

The present invention relates generally to cups, and, in particular, relates to means for carrying the cups, and, in greater particularity, relates to means for carrying coffee cups of different sizes and further preventing spills.

Description of the Prior Art

Drinking coffee in the morning is an American tradition and many people obtain their morning brew at coffee drive-ups. Unfortunately, it is difficult to drink from the coffee cup since one must tilt the cup upwards in front of your head. So, the cup is placed in the holder and one only drinks at stops if possible and/or carries it into the home or work, for example.

Spilling of coffee from traditional coffee cups while sitting in a vehicle is common place, and happens for many reasons such as the lid is not properly attached, the coffee is filled to close to the top, placing the coffee cup in a vehicle holder may cause tilting and spilling, replacing the cup back into the holder may cause spilling, transferring the coffee to a larger container such as a coffee mug causes spilling, the coffee itself may become cold, and the coffee cup itself is too hot to handle and/or is dropped, etc.

Attempts have been made to address some of the above problems. U.S. Pat. No. 8,141,740 illustrates having an external housing of a container shaped as a cone with a cup with a lid thereon. US Patent Application Publication 2005/0082455 illustrates a cup holder like in a car console. US Patent Application Publication 2010/0200720 illustrates multiple jaws for holding a beverage container in a holder. US Patent Application Publication 2012/0049030 illustrates a cup holder that can be mounted between car seats or in a console. US Patent Application Publication 2014/0197657 illustrates a car console having multiple cup holders. US Patent Application Publication 2016/0039324 illustrates a modular cup holder for a console.

All cited references are incorporated herein.

Accordingly, there is a need for a container for holding coffee cups securely that can be placed in vehicles consoles.

SUMMARY OF THE INVENTION

A cup container has a removable cap upon a bottom container. The cup container is preferably intended to fit into a vehicle console holder. Inside the cup container is a standard sized coffee cup, for example, with its lid thereon such as available at McDonald's®, small 12 oz., medium 16 oz., or large 21 oz or other sizes. Further it should be understood that any paper or plastic cup with a lid that is frustum shaped may be used in the present invention. The words "coffee cup" will be used herein, but the invention is not limited to such as would be known to one skilled in the art. Further the cap has a hollow interior that is or may be a partial vacuum or insulated to prevent heat from passing therethrough. A lid spacer inside of the cup container fits loosely over the top of the coffee cup lid to center it. The cup container has an interior/inner wall/housing integrally formed to a top edge of the outer wall so that the volume between the outer wall and the interior wall may also be a partial vacuum or insulated. The coffee cup container with a coffee cup therein may be carried without spilling liquid therefrom. The cap although preferably a push-on, a screw-on is also available. The outer walls may have logos, pictures, advertisement thereon.

It is an object of the present invention to provide a coffee cup container that replaces a conventional coffee mug for securely holding the coffee cup therein;

It is another object of the present invention to provide a coffee cup container that prevents spills and is easily fitted into vehicle holders;

It is a further object of the present invention to provide a coffee cup container that is able to hold conventional coffee cups of varying sizes;

It is still a further object of the present invention to provide a coffee cup container that provides ease of access when fitted into a console holder;

It is still another object of the present invention to provide a coffee cup container that avoids spilling coffee from a coffee cup as in a traditional coffee mug; and It is still another object of the present invention to provide a coffee cup container to prevent spilling of coffee from convention coffee cups inside of a vehicle.

These and other objects, features, and advantages of the present invention will become more readily apparent from the attached drawings and the detailed description of the preferred embodiments, which follow.

BRIEF DESCRIPTION OF THE DRAWINGS

Like reference numerals refer to like parts throughout the several views of the drawings.

DETAILED DESCRIPTION OF THE PREFERRED EMBODIMENTS

In general, the present invention provides a cup container that fits into a vehicle console holder. This invention in its preferred embodiment is directed at standard sized coffee cups such as available at McDonald's, 12 oz., 16 oz., and 20 oz.; small, medium, and large whether plastic or paper. Thus the coffee cup container may also come in different sizes to accommodate different sizes of coffee cups. The cap of the cup container is designed to closely fit into the top hole of the lower container 14. Further the cap may or may not have a hollow interior that is or may be a partial vacuum to prevent heat from passing therethrough. A lid spacer fits loosely over the top of the coffee cup to center it. The coffee cup container has an interior housing integrally formed to the top edge of the outer wall. The volume between the outer wall and the interior housing or inner wall may also be a partial vacuum to prevent heat from passing therethrough. In one embodiment, an interior ledge holds or is formed to hold by means of a ring retainer the coffee cup centered therein. The coffee cup space may further act as a reservoir for spilled liquid. The coffee cup container with a coffee cup therein may be carried without spilling liquid therefrom. A bottom interface member can be used to fit into the cup coffer holder in a console of a car if the container is too large. In another embodiment, an interior housing slides within the inner wall of the container. A loosely formed spring allows the interior housing to move in response to different sizes of coffee cups. The lid spacer fits over the top of the coffee cup and the spring pushes the lid against the cap. The diameter of the container is sufficiently larger than the diameter of the coffee cup so that fingers can lift the coffee cup out of the container. The cup container may further have a handle and/or be frustum shaped to fit into many different vehicle holders.

Figure 1:
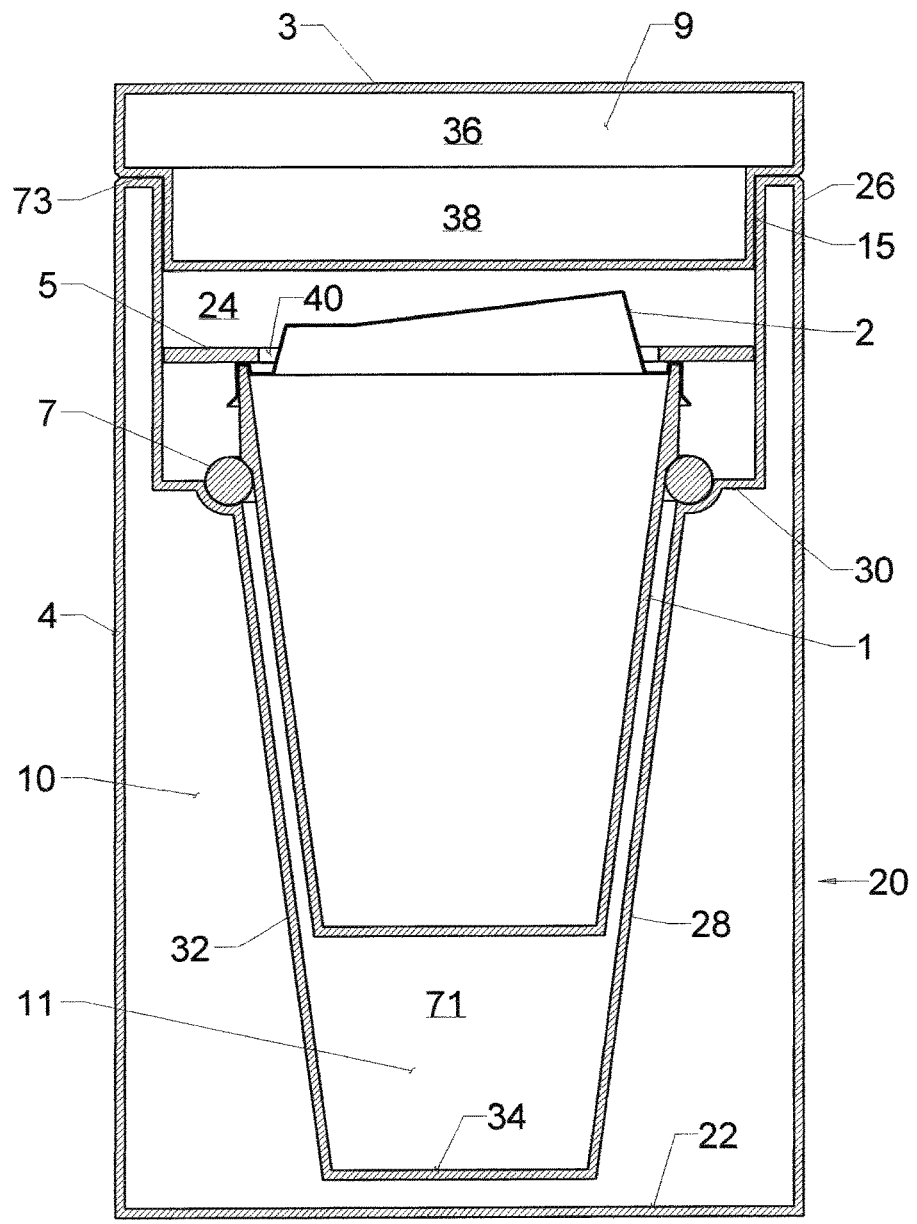
FIG. 1 illustrates by cross section the present invention wherein a cup container has a conventional cup with a lid thereon inside the container that can be placed in a vehicle holder like in a center console. This cup may be a coffee cup whether plastic or paper.

Referring to FIG. 1, a cross sectional view of a cup container 20 is shown. The horizontal cross sections show circular structures and most are cylindrically shaped. Although it is primarily noted for use with conventional cups 1 such as might be available from McDonald's® and other fast food establishments, other liquid holding means may be included that are frustum shaped. The cup container 20 has a cylindrical outer wall 4, a bottom wall 22 integrally formed to the outer wall 4, an aperture 24 in a top 26 about the outer wall 24, a cap 3 being adapted to fit closely within the aperture 24, an inner wall 28 formed integrally to the top 26 of the outer wall 4, the inner wall 28 having a cylindrical horizontal cross section, a ledge section 30, and a frustum section 32, and a bottom 34, all integrally formed together unless otherwise noted. A retainer ring 7 is mounted in said inner wall 28 being capable of holding a coffee cup 1 with a lid 2 therein. Although a retainer ring 7 is shown, other devices such as flexible fingers may be used. To accommodate different sizes of cups, an internal space or volume 11 is provided at the bottom of the coffee cup space 71. The coffee cup container 20 may be made for preferably a single sized cup although other sizes may fit therein as would be made known to the customer.

The cap 3 is formed of a first cylindrical section 36 and a second cylindrical section 38, the first and said second sections 36 and 38 respectively being integrally formed together, and further having a lip wall 73 that may rest upon top 26. A void 9 is formed within the cap 3 and this void 9 may be a partial vacuum or filled with an insulating medium. A movable retainer 5 is mountable in said cylindrical section 24 and has an aperture 40 therein for allowing a lid 2 of a coffee cup 1 to fit therein. This movable retainer 5 can be removed so as to be able to remove the coffee cup 1 for drinking. Drinking from the cup container 20 is not possible in that the coffee cup 1 is not secured therein.

Figure 2:
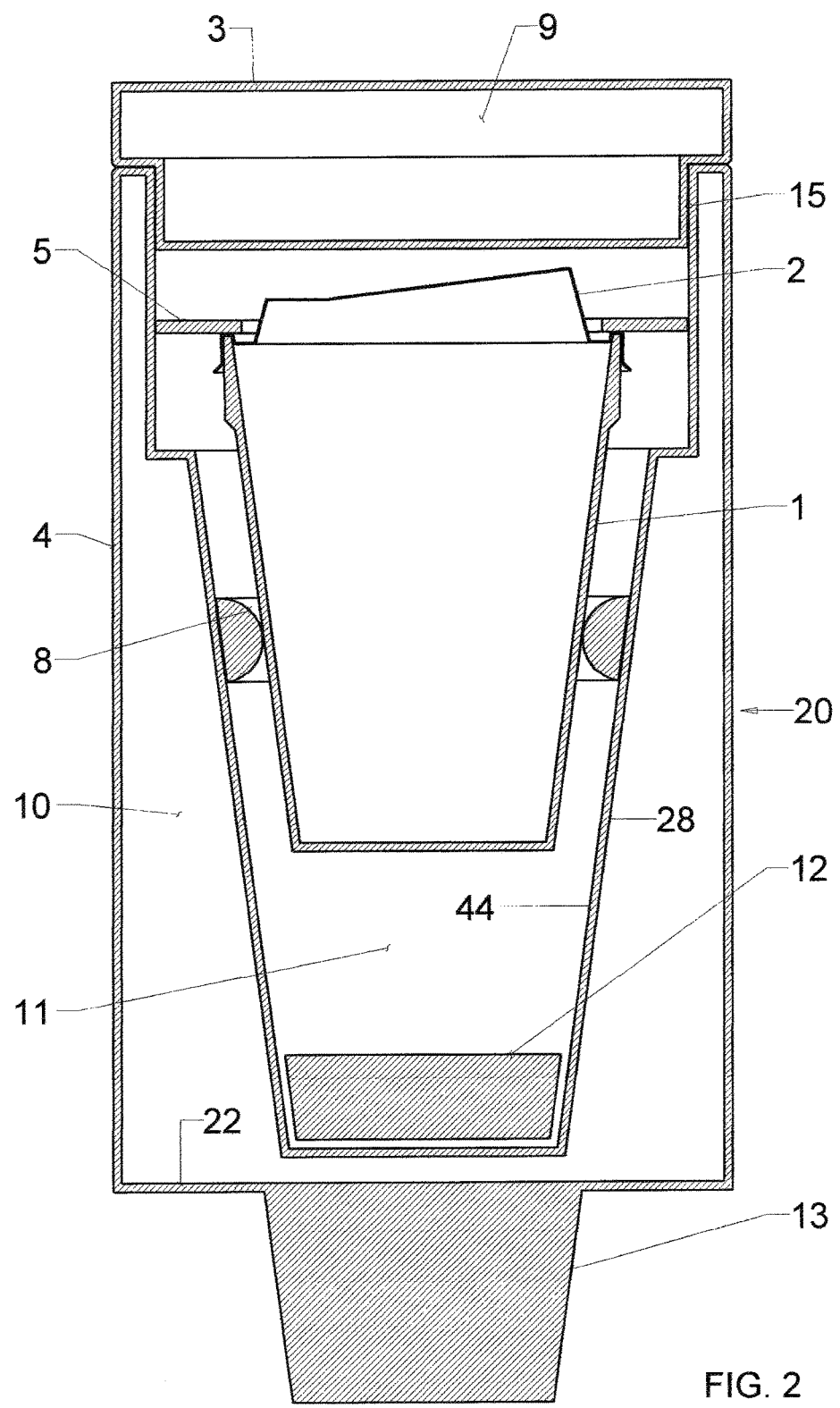
FIG. 2 illustrates by cross section another embodiment of the present invention wherein a coffee cup container has a conventional coffee cup with a lid thereon inside the container that can be placed in a vehicle holder like in a center console having an interface member therein.

FIG. 2 shows an alternative version wherein a ring retainer 8 is mounted upon an inner surface 44 of the inner wall 28. The ring retainer 8 may be bumps (as seen in FIG. 2) formed in the plastic inner wall 48 or actually a circular ring. The use of the word "ring" is thus implied to mean any structure for supporting the coffee cup 1 inside of the inner wall 28. Also shown therein, is an absorbent material 12 such a sponge that would collect any liquids spilled in the cup container 20. Also shown thereon, is an interface device 13 formed on the bottom 22 that may be used to place a larger cup container 20 into a console holder and thus be elevated above the holder for easier access. It may be circular in shape, frustum in shape as shown, or even a single wall as shown.

It should understood that the cup container 20 is manufactured with conventional known techniques and materials such as plastics.

Figure 3:
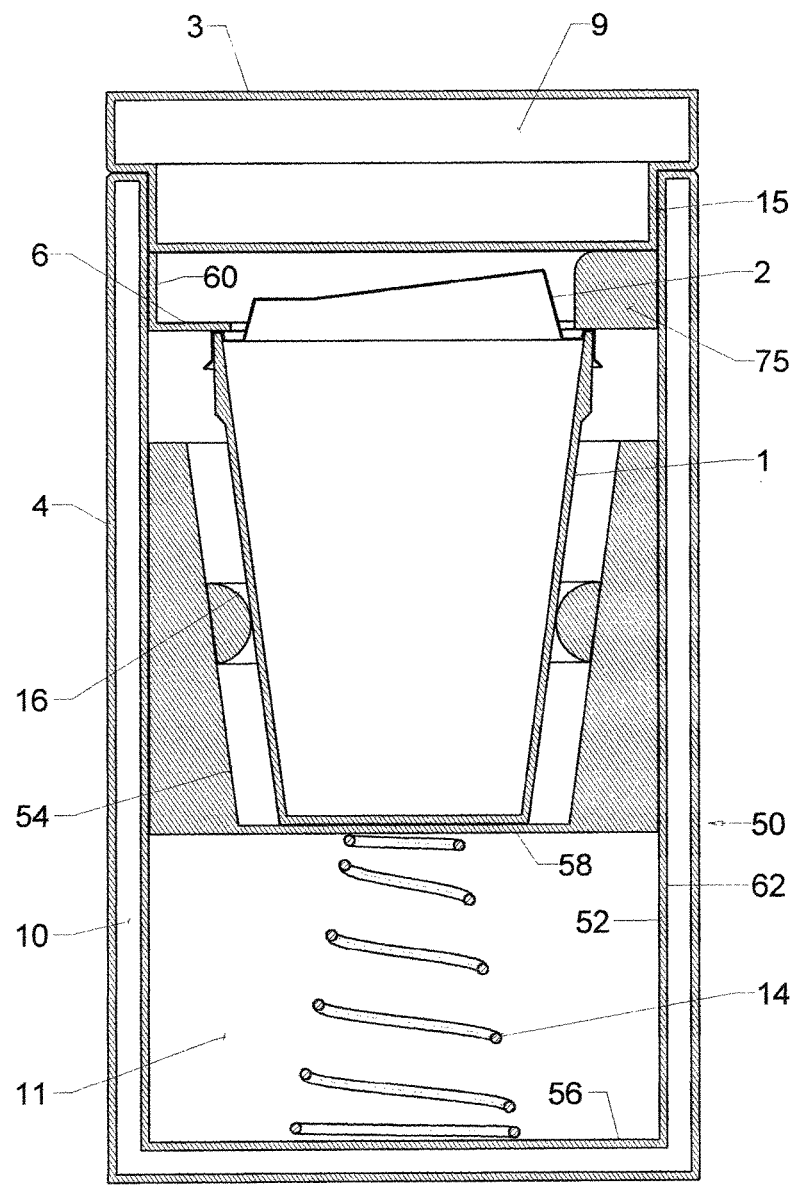
FIG. 3 illustrates by cross section another embodiment of the present invention wherein a coffee cup container has a conventional coffee cup with a lid thereon inside the container that can be placed in a vehicle holder like in a center console; this embodiment having a biased sliding coffee cup support.

FIG. 3 illustrates another alternative version for holding different sizes of coffee cups 1. A sliding coffee cup support 50 is translatably mounted in an inner wall 52, a frustum shaped coffee cup support wall 54 and has a ring retainer 16 mounted in said frustum shaped coffee cup support wall 54 to hold the coffee cup 1; also a spring 14 is mounted to a bottom 56 of the inner wall 52 such that the spring 14 is in constant contact with a bottom 58 of the sliding coffee cup support 50 such that the spring 14 biases the sliding coffee cup support 50 in an upward direction such that when said coffee cup 1 is mounted therein as shown, a retainer spacer 6 is pushed against the cap 3. Adjustment in the size of the cup 1 may be made by adjusting a retainer spacer vertical wall 60. Further a small handle 75 may be included on the retainer space 6 to aid in the removal of the retainer space 6 in any version. The alternative embodiment shown in FIG. 3 has similar components as shown as in FIGS. 1 and 2. Further a void 10 between the outer wall 4 and an inner 62 may be a void with a partial vacuum or filled with an insulating material to prevent the flow of heat through the walls.

Figure 4:
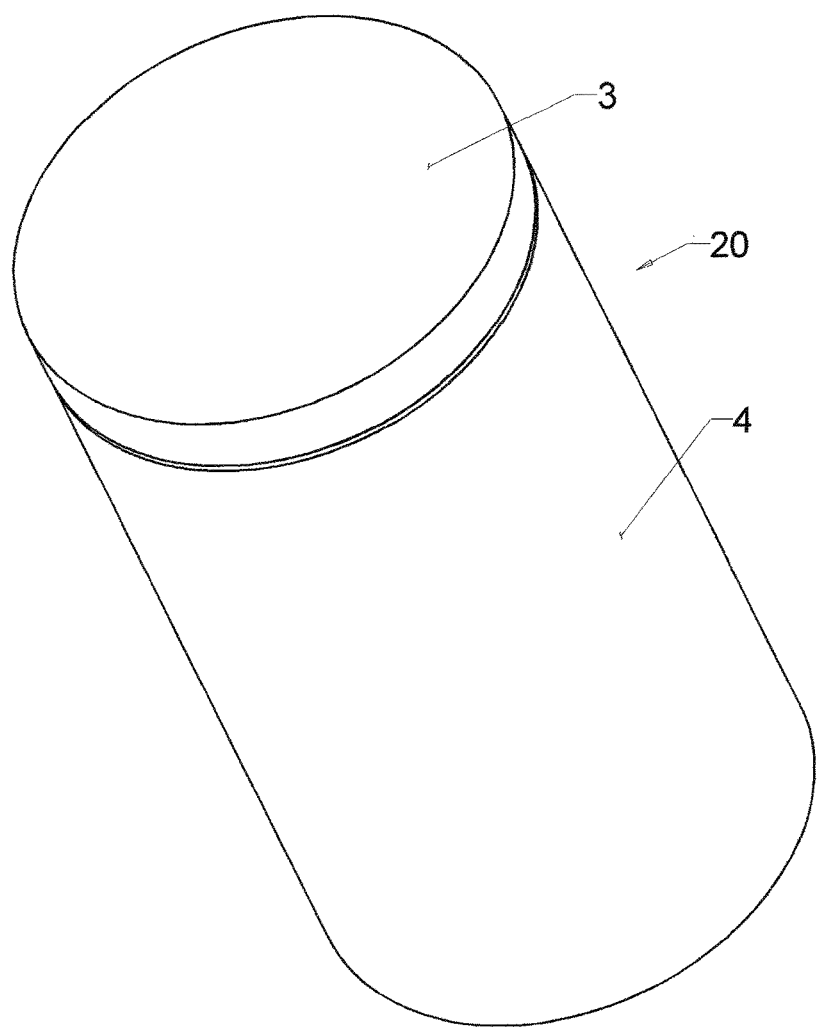
FIG. 4 illustrates by a perspective top view the present invention wherein a coffee cup container has a conventional coffee cup with a lid thereon inside the container that can be placed in a vehicle holder like in a center console.

FIG. 4 is a perspective view of the cup container 20 being of cylindrical design of both the cap 3 and the outer wall 4.

Figure 5:
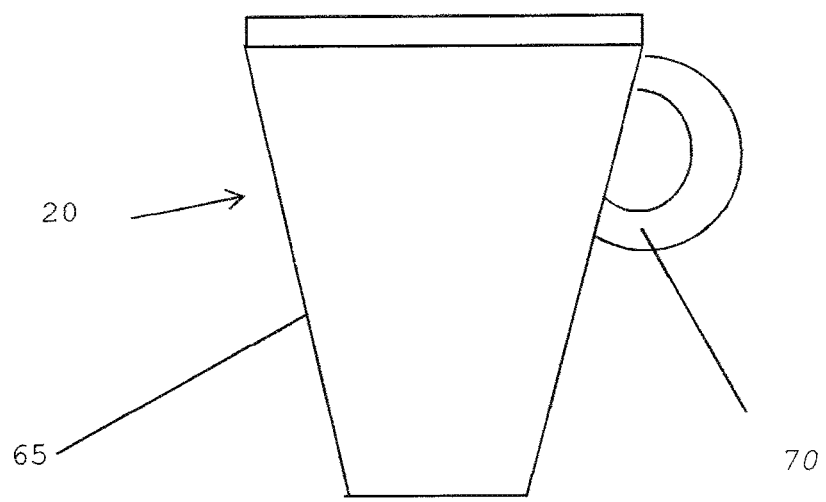
FIG. 5 illustrates by a partial cross section the present invention as shown in FIG. 4 wherein a coffee cup container has a frustum shaped outer wall and also has a conventional coffee cup with a lid thereon inside the container that can be placed in a vehicle holder like in a center console.

FIG. 5 illustrates a cup container 20 having an outer wall 65 shaped as a frustum and also including a handle 70 thereon. Clearly a handle 70 may be included on any version of the cup container 20.

A method for holding a coffee cup 1 within a cup container 20 comprises the steps of removing a cap 3 on the container 20, inserting the coffee cup 1 into the container 20 and placing the cap 3 onto the cup container 20. A retainer spacer 6 may also be on a top of the coffee cup lid 2.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A container for holding a cup, said container comprising:
   a cylindrical outer wall;
   a bottom wall integrally formed to said outer wall;
   an aperture in the top about said outer wall;
   a cap, said cap adapted to fit closely within said aperture;
   an inner wall, said inner wall formed integrally to a top of said outer wall, said inner wall being substantially cylindrical, and a bottom,
   a movable retainer being mountable in said cylindrical section of said inner wall and having an aperture therein for allowing a lid of the cup to fit therein,
   a sliding coffee cup support, said sliding coffee cup support translatably mounted in said inner wall, a frustum shaped cup support wall, a bottom integrally formed to said cup support,
   a ring mounted in said frustum shaped cup support wall to hold said cup; and
   a spring mounted to the bottom of said inner wall, said spring in constant contact with a bottom of said sliding cup support;
   wherein said spring biases said sliding cup support in an upward direction, such that when said cup is mounted therein, said spacer is pushed against said cap.

2. The container as defined in claim 1, wherein said cap comprises a first cylindrical section and a second cylindrical section, said first and said second sections being integrally formed together, a void being within said cap.

3. The container as defined in claim 1, wherein said void is a partial vacuum or an insulating material therein.

4. The container as defined in claim 1, further including an interface device mounted fixedly to said bottom of said outer wall, being capable of removably mounting to a vehicle cup holder.

5. The container as defined in claim 1, wherein said cup holder is located in a center console of a vehicle.

6. The container as defined in claim 1, wherein a void is formed between said outer wall and said inner wall, said void being a partial vacuum or an insulating material.

7. The container as defined in claim 1, wherein in said container may hold a small 12 oz., a medium 16 oz. or a 21 oz. coffee cup or any other cup being made of paper or plastic and having a frustum shape.

8. A container for holding a cup, said cup being paper or plastic and being frustum shaped, said container comprising:
   a cylindrical outer wall;
   a bottom wall integrally formed to said outer wall;
   an aperture in a top about said outer wall;
   a cap, said cap adapted to fit closely within said aperture;
   an inner wall, said inner wall formed integrally to a said top of said outer wall, said inner wall having a cylindrical section, a ledge section, and a frustum section, and a bottom formed integrally to said inner wall, and
   a ring mounted in said inner wall being capable of holding a coffee cup with a lid therein, and
   a movable retainer being mountable in said cylindrical section of said inner wall and having an aperture therein for allowing a lid of the coffee cup to fit therein.

* * * * *